Jan. 30, 1951  E. G. BERG  2,539,688
POULTRY PICKING MACHINE
Filed June 10, 1946  2 Sheets-Sheet 1

Inventor
EMIL G BERG
By The Firm of Charles H Wills
Attys.

Jan. 30, 1951  E. G. BERG  2,539,688
POULTRY PICKING MACHINE
Filed June 10, 1946  2 Sheets-Sheet 2
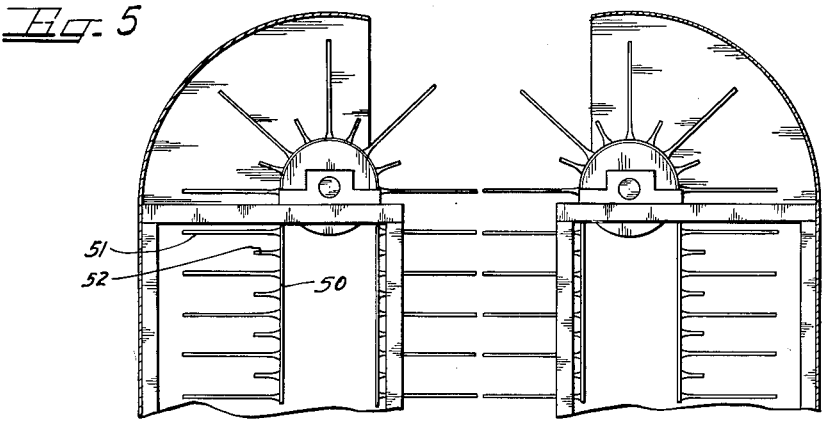
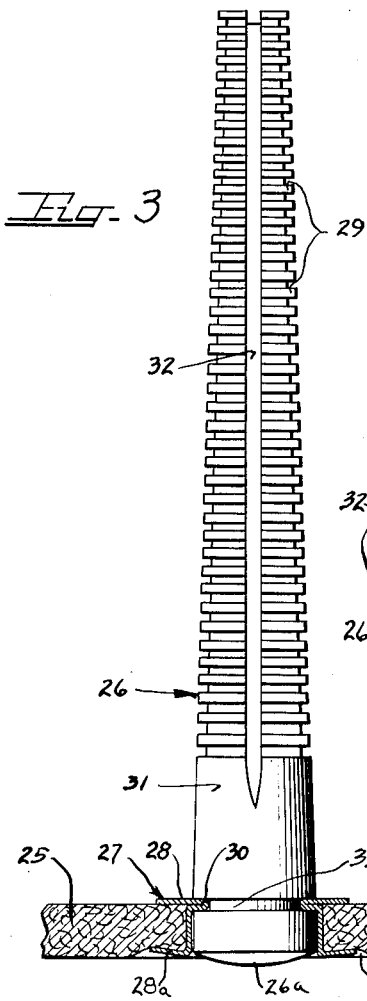
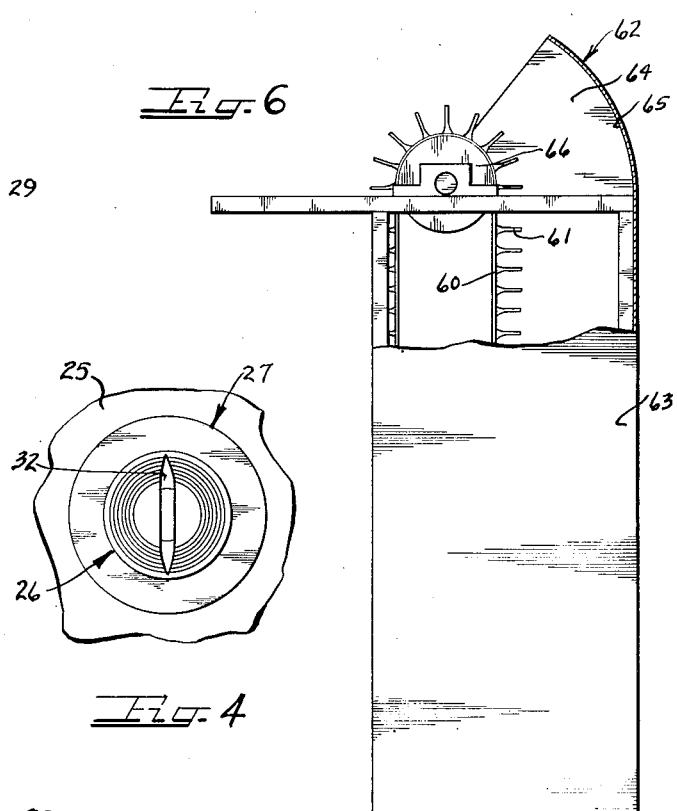
Inventor
EMIL G. BERG Patented Jan. 30, 1951

2,539,688

UNITED STATES PATENT OFFICE 2,539,688

POULTRY PICKING MACHINE

Emil G. Berg, New Ulm, Minn.

Application June 10, 1946, Serial No. 675,542

3 Claims. (Cl. 17—11.1)

This invention relates to improvements in a poultry picking machine and more particularly it relates to that type of machine which removes feathers, hair and the like from a bird by bringing the bird in contact with a series of rapidly moving fingers or projections.

In automatic plucking apparatus it has heretofore been the practice to draw the bird to be plucked over a rotating cylinder the exterior surface of which has a large number of fingers projecting therefrom. The feathers are removed by striking or pulling action of the fingers on the body of the bird. The efficiency of the operation is dependent to a large extent upon the design of the fingers, the positioning of the fingers on the cylindrical drum and the amount of the bird's body that is contacted by the fingers. It is evident that a long bird such as a turkey or a goose, which is hung in a conveyor by its feet with head downward in the usual processing position, will not be completely subjected to the action of the projecting fingers due to the curvature of the cylindrical drum. Thus the feathers cannot be plucked efficiently from large birds in an automatic processing system with existing equipment.

In my invention I have solved this problem by the use of two rotating drums mounted in vertically disposed relation to each other. A belt carrying a plurality of specially designed fingers projecting from its outer surface is positioned around these drums for rotation therewith. It is therefore evident that, by regulating the spacing of the drums, an effective vertical surface of belt of any desired length may be had between the drums. If two such machines are mounted facing each other, the bird to be plucked can be automatically conveyed between the machines so that the fingers move across the bird and remove the feathers in a single passage therethrough.

It is therefore an object of this invention to provide a poultry picking machine having an effective working surface large enough to automatically strip the feathers from any size fowl without it being necessary to raise or lower or in any way change the line of travel of the bird in an automatic processing production line.

It is another object of this invention to provide a poultry picking machine that will completely remove feathers and the like from a bird without tearing or bruising the flesh of the bird.

It is a further object of this invention to provide a poultry picking machine that is inexpensive to manufacture, efficient and economical to operate, and easy to maintain.

Accordingly, it is an important feature of my invention to provide an endless belt which travels around two cylindrical drums and carries projecting from its exterior surface a number of picker fingers for contacting the feathers of the bird to be plucked.

Another feature of my invention resides in the provision of a novel picker finger which has a plurality of circular ridges on its exterior surface and is provided with vertical grooves on either side which permit the finger to bend and twist and more efficiently contact the body of the bird.

It is a further feature of my invention to provide a poultry picker employing picker fingers of various lengths at the same time.

Another important feature of this invention is the provision of novel metal grommets for retaining the picker fingers in the moving belt.

Other and further objects and advantages will be apparent to those skilled in the art from the following description of the annexed sheets of drawings.

On the drawings:

Figure 3 is a fragmentary sectional elevational view of a picker finger mounted in the moving belt;

Figure 4 is a plan view of the apparatus of Figure 3;

Figure 5 is a fragmentary, sectional, side elevational view of a modified form of the machine of my invention; and Figure 6 is a side elevational view, partly in section and partly broken away, of a second modification of the machine of my invention.

Figure 1:
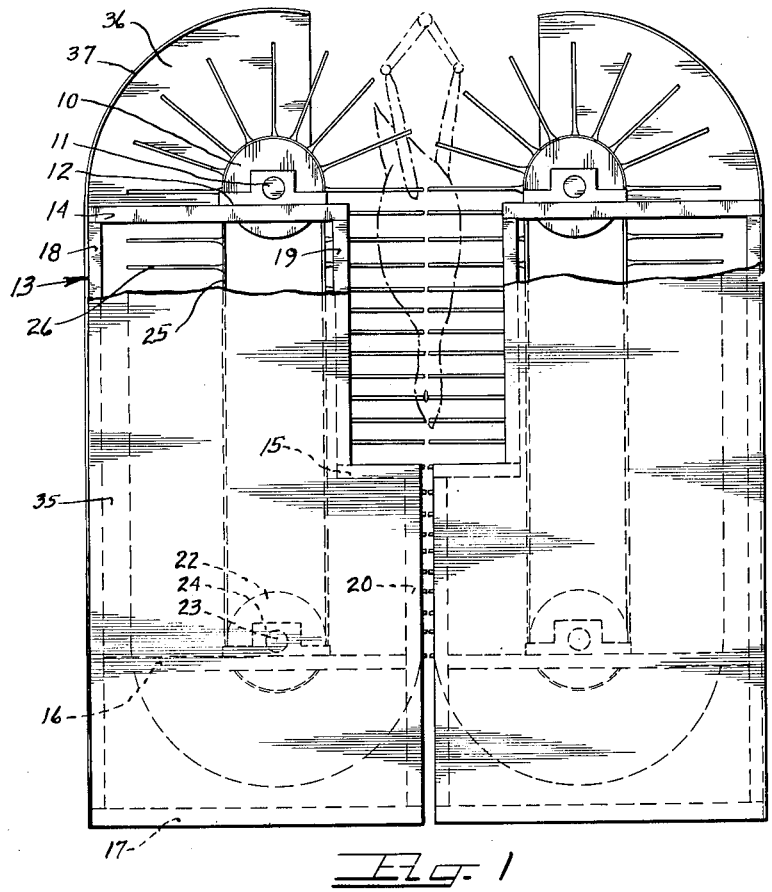
Figure 1 is a side elevational view, partly broken away, of a preferred embodiment of my invention showing two of the machines of my invention mounted opposite each other, and also showing in dot-dash lines a fowl, suspended from an overhead conveyor, about to be passed between the fingers of the machines.
Figure 2:
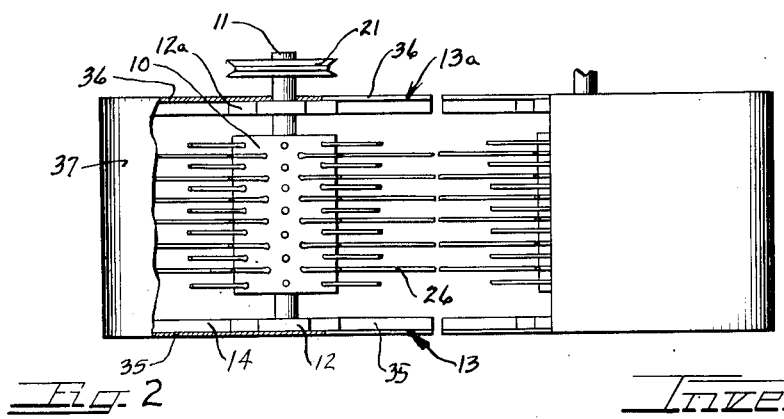
Figure 2 is a plan view, partially broken away and partially in section of the apparatus of Figure 1.

Referring to the embodiment of my invention illustrated in Figures 1 and 2, there is shown therein a cylindrical drum 10 mounted on shaft 11 for rotation therewith. The shaft 11 is journalled at one end in bearing 12 which is rigidly secured, as by welding to a horizontal member 14 of a support frame 13 consisting of horizontal angle bars 14, 15, 16 and 17 and vertical angle bars 18, 19 and 20. These angle bars are all welded together to form the support frame 13. The shaft is also journalled in a bearing 12a rigidly secured to a support frame 13a which is identical to frame 13 except that it is facing in the opposite direction. A pulley 21 for a belt-drive is secured to the end of the shaft 11. This pulley may be connected to any suitable reversible power source, preferably a small electric motor.

Directly below drum 10 and positioned in spaced relation thereto is a similar cylindrical drum 22. Drum 22 is rotatably mounted on a shaft 23 which is journaled at one end in a bearing 24. The bearing 24 is rigidly secured to horizontal member 16 of support frame 13. At its other end the shaft 23 is journalled in a bearing (not shown) identical with bearing 24 which is also mounted on a horizontal member of frame 13.

The novel means provided in my invention for bringing the picker fingers in contact with the bird comprises an endless belt 25, made of leather or suitable non-metallic, metallic or composition material, positioned around drums 10 and 22 for frictional rotation in either direction therewith. Picker fingers 26 are disposed on the belt 25 in uniform crosswise rows, the fingers of each row being in staggered relation to those of the preceding row. It has been found that by staggering the fingers in each row more rows per foot of belt can be accommodated without interference of the fingers with each other and consequently a more efficient picking action can be produced.

As best shown in Figure 3, a new method of securing each individual picker finger 26 to the endless belt 25 has been provided in my invention. A metal grommet 27 is positioned in a cylindrical hole in the belt 25. Flanges 28 and 28a are bent over the edge of the hole to firmly position the grommet on the belt. Since it is desirable that the metal grommets do not contact the drum on which the belt rides, a slight recess 25a is provided on the underside of the belt for each grommet and the flange 28a is pressed therein. A ring-shaped flange 30 is formed on the grommet which protrudes inwardly in the channel formed by the inside surface of the grommet.

The picker finger 26, in a preferred form shown in Fig. 3, is made of rubber or some other flexible material. It has a circular cross-section and is tapered from top to bottom the top having the smaller cross-section. Peripheral ridges 29 are provided on the surface of the finger extending from the top thereof to a relatively rigid base section 31. These ridges 29 constitute a very efficient surface for frictionally gripping the feathers. A slot 32 extends up one side of the finger, across the top thereof and down the other side. This slot permits the finger to twist slightly and provides a longitudinal edge for most efficiently contacting feathers in the crotch between the legs of the bird and under the wings.

Near its lower end a cylindrical groove 33 is provided in the finger 26. The finger 26 is positioned in the belt 25 by inserting the small top end in the grommet 27 from the lower side of the belt, which is the inner surface of the belt when in operation. The finger 26 is pushed up into the grommet 27 until the inwardly projecting ring 30 of the grommet takes its position in the groove 33 of the finger. Since the base 31 is solid, having no grooves or slots therein, it is relatively unyielding. Therefore a certain amount of pressure is required to position the ring 30 in the groove 33. For the same reason, once the ring 30 is so positioned, the finger is securely anchored and not subject to being displaced when the belt is moving.

Each finger 26 has a shallow spherical lower end 26a which extends slightly below the surface of the belt and provides an effective auxiliary gripping means for preventing slippage of the belt on the drum.

By means of tests I have found that a machine having a belt with a width, for example, of 14 inches, which carries picker fingers of relatively long length, such, for example, as in the neighborhood of 12 inches, and preferably having a circular cross-section and being slotted and grooved according to my invention, will very efficiently remove the feathers from large poultry. The distance between drums, of course, should be great enough so that the entire length of a large bird is contacted in the same operation. The finger carrying belt may, of course, be of any suitable width.

It is also to be understood that the fingers may be of any desired length, since in some cases, when only birds of a certain size range are being processed, a definite modified length of finger may give most efficient results. Also, it is contemplated that the finger may have a cross-section other than circular, as, for instance, square or oval, and be held in suitable grommets. A finger having one cross-section at its base and another cross-section along the flexing portion is also within the scope of this invention, as, for example, a finger having a circular base and a square flexing portion. It is also contemplated that the ridges on the periphery of the finger may be conveniently formed as a helical or screw thread.

As a safety feature and to prevent foreign matter from interfering with the operation of this machine, I have provided side plates 35 and 36 which are secured to support frames 13 and 13a, respectively, as shown in Figures 1 and 2. These side plates 35 and 36 are each made in the shape of a quarter-circle at their upper end. As best shown in Figure 2, a rear cover plate 37 is fastened, as by welding, to the edge of side plates 35 and 36 to form the rear wall of the machine and also is secured to the arched edge of these side plates to form a hood. This hood prevents feathers and the like from being thrown outwardly from the machine.

In Figure 5 is illustrated a modified form of my invention. The construction and the operation of these machines are exactly the same as was disclosed in connection with Figure 1, with this exception. In this embodiment the belt 50 carries alternate crosswise rows of long and short fingers. It has been found in the processing of certain types of poultry that this arrangement of alternate long and short fingers greatly reduces the possibility of injury to the wings of the bird.

A further embodiment of my invention is illustrated in Figure 6. The construction and the operation of this machine are exactly the same as was described in connection with the machine of Figure 1, with these exceptions. The belt 60 carries staggered rows of short picker fingers 61, and the hood 62 formed by the side plates 63 and 64 and the rear cover-plate 65 does not extend forward as far as the hood of Figure 1. The hood 62 is shorter in this case to facilitate the manual positioning of the bird in contact with the moving fingers. The drum 66 is rotated clockwise and as a result feathers and the like are caught by the hood 62 and directed downwardly to a receptacle or to the floor under the machine.

The machine of my invention is put into operation by bringing the bird to be cleaned into contact with the rapidly moving picker fingers. This may be done, as illustrated in Figure 1, by suspending the bird on a moving conveyor and moving it across the machine from side to side. In this operation the moving fingers travel downwardly over the bird. Or, as in the machine of Figure 6, the bird is laid by hand against the moving fingers in a direction opposite to the movement of the fingers so that the fingers move across the bird and remove the feathers.

As the fingers contact the bird they bend or flex backwardly and, as the belt moves along, the ridges on the fingers frictionally grip the feathers and strip them from the bird. Due to the flexibility of the fingers, the feathers are removed by a rubbing action rather than a beating action, and as a result the skin of the bird is not torn or bruised.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a poultry picking machine, an endless belt, means for supporting said belt, power means for driving said belt, and a plurality of flexible fingers, said belt having grommets therein for receiving said flexible fingers, each of said fingers having a plurality of projections on its surface and a groove extending along each side thereof and having an annular groove in proximity to its base into which one of said grommets may be snapped, whereby said finger is held in a firm, upright position on said belt.

2. In a poultry picking machine, an endless belt, means for supporting said belt, power means for driving said belt and a plurality of flexible picking fingers, said belt having grommets therein for receiving said fingers, each of said fingers having a plurality of projections on its surface and a groove extending along each side thereof and having an annular groove in proximity to its base into which one of said grommets may be snapped, whereby said finger is held in a firm, upright position on said belt, the inner end of said base of each of said fingers being spherically shaped for providing an auxiliary frictional gripping surface for said belt with said supporting means as said belt passes thereover.

3. In a poultry picking machine, an endless belt, means for supporting said belt, power means for driving said belt and a plurality of flexible picking fingers, said belt having grommets therein for receiving said fingers, each of said fingers having a plurality of projections on its surface and a groove extending along each side thereof and having an annular groove in proximity to its base into which one of said grommets may be snapped, whereby said finger is held in a firm, upright position on said belt, the inner end of said base of each of said fingers extending slightly through said belt for frictional engagement with said belt supporting means as said belt passes thereover.

EMIL G. BERG.

REFERENCES CITED

The following references are of record in the file of this patent:

UNITED STATES PATENTS

| Number | Name | Date |
|---|---|---|
| 208,432 | Spadone | Sept. 24, 1878 |
| 1,113,438 | Hess | Oct. 13, 1914 |
| 1,321,686 | Varden | Nov. 1, 1919 |
| 1,834,479 | Taylor | Dec. 1, 1931 |
| 1,889,228 | Swanson | Nov. 29, 1932 |
| 2,169,772 | Schweitzer | Aug. 15, 1939 |
| 2,235,619 | McMahan et al. | Mar. 18, 1941 |
| 2,302,525 | Campbell | Nov. 17, 1942 |
| 2,305,232 | Barker | Dec. 15, 1942 |
| 2,311,365 | Campbell | Feb. 16, 1943 |
| 2,337,201 | Johnson | Dec. 21, 1943 |
| 2,376,120 | Campbell et al. | May 15, 1945 |
| 2,389,404 | Barker | Nov. 20, 1945 |
| 2,413,712 | Jerome | Jan. 7, 1947 |
| 2,432,523 | Johnson | Dec. 16, 1947 |
| 2,469,345 | Toti et al. | May 3, 1949 |
| 2,469,953 | Davis | May 10, 1949 |
| 2,484,236 | Mead | Oct. 11, 1949 |